(12) United States Patent
Liu et al.

(10) Patent No.: US 11,933,663 B2
(45) Date of Patent: Mar. 19, 2024

(54) INTERNAL CALIBRATION MECHANISM FOR A WEIGH MODULE

(71) Applicant: Mettler Toledo Instrument (Shanghai) Company Limited, Shanghai (CN)

(72) Inventors: Baohui Liu, Shanghai (CN); Chao Wu, Shanghai (CN); Weixiang Sun, Shanghai (CN); Naifeng Bian, Shanghai (CN); Tianhua Xia, Shanghai (CN); Feng Min, Shanghai (CN)

(73) Assignee: Mettler Toledo Instrument (Shanghai) Company Limited, Shanghai (CN)

( * ) Notice: Subject to any disclaimer, the term of this patent is extended or adjusted under 35 U.S.C. 154(b) by 290 days.

(21) Appl. No.: 17/247,521

(22) Filed: Dec. 15, 2020

(65) Prior Publication Data
US 2021/0199491 A1    Jul. 1, 2021

(30) Foreign Application Priority Data

Dec. 31, 2019   (CN) .......................... 201911414983.2

(51) Int. Cl.
*G01G 23/01*   (2006.01)
(52) U.S. Cl.
CPC .................................. *G01G 23/012* (2013.01)
(58) Field of Classification Search
CPC ................................................... G01G 23/012
See application file for complete search history.

(56) References Cited

U.S. PATENT DOCUMENTS

| | | | | |
|---|---|---|---|---|
| 5,866,854 A * | 2/1999 | Emery | ................ | G01G 23/012 177/229 |
| 6,194,672 B1 * | 2/2001 | Burkhard | ............. | G01G 21/244 73/1.13 |
| 6,232,567 B1 * | 5/2001 | Bonino | ................ | G01G 21/244 177/229 |
| 6,365,847 B1 * | 4/2002 | Muller | .................... | G01G 7/02 177/210 EM |
| 6,414,252 B1 * | 7/2002 | Emery | ................ | G01G 23/012 73/1.13 |
| 6,861,593 B2 * | 3/2005 | Kuhlmann | ........... | G01G 21/244 73/1.13 |

(Continued)

FOREIGN PATENT DOCUMENTS

DE    202005017241 U1 * 3/2006 ............ G01G 19/04

*Primary Examiner* — Natalie Huls
(74) *Attorney, Agent, or Firm* — Standley Law Group LLP; Jeffrey S. Standley; Adam J. Smith

(57) ABSTRACT

An internal calibration mechanism of a weigh module has a driving structure, a calibration weight and a weight support frame. The weight support frame has an opening or a groove for loading the calibration weight. The weight support frame is connected to a load receiving portion at both sides thereof and is connected to a portion of a fixing portion that extends towards the load-receiving portion. In one case, the weight support frame, the load-receiving portion and the fixing portion are integrally formed. In another case, a force transmission connecting portion and a fulcrum connecting portion of the weight support frame are fixedly connected, respectively, to the load-receiving portion and to the extending portion of the fixing portion. In another case, flexure hinges connect the weight support frame to the load-receiving portion at both sides thereof and connect the weight support frame to the extending portion.

7 Claims, 2 Drawing Sheets

(56) References Cited

U.S. PATENT DOCUMENTS

| | | | | |
|---|---|---|---|---|
| 7,513,139 B2* | 4/2009 | Genoud | ............... | G01G 23/012 |
| | | | | 73/1.13 |
| 2005/0178591 A1* | 8/2005 | Koppel | ............... | G01G 21/244 |
| | | | | 177/229 |
| 2017/0131135 A1* | 5/2017 | Yang | .................... | G01G 21/244 |
| 2021/0140813 A1* | 5/2021 | Reiners | ............... | G01G 23/012 |

* cited by examiner

INTERNAL CALIBRATION MECHANISM FOR A WEIGH MODULE

CROSS-REFERENCE TO RELATED APPLICATIONS

This application is a non-provisional application that claims priority to Chinese application 201911414983.2, filed 31 Dec. 2019.

TECHNICAL FIELD

The present invention relates to an internal calibration mechanism suitable for a balance, especially for a weigh module in an electronic balance.

BACKGROUND ART

With the change of environment and time, weigh modules in electronic balances need to be recalibrated to ensure weighing accuracy. Most electronic balances are each provided with an accurate weight for calibration before weighing. If the electronic balance is not provided with the accurate weight, the balance cannot be calibrated, so that the electronic balance is not available. Because the accurate weight needs to be stored separately, it causes great inconvenience in use. At present, the solution is to add an internal calibration mechanism to the electronic balance for automatic calibration, so there is no need to additionally provide an external measuring weight for calibration, which brings great convenience to an end user.

Installing the internal calibration mechanism in the electronic balance brings convenience and accuracy of weighing, but also brings a disadvantage, that is, it will occupy an internal space of the electronic balance. In order to ensure the accuracy of calibration, the weigh module with a greater weighing range correspondingly requires an internal calibration weight with greater mass. In the design of some weigh modules with a large range, due to the limitation of size and space, the size of the internal calibration weight is required not to be excessively large. In this case, the weight and size of the internal calibration weight are limited, so that the corresponding mass during internal calibration cannot meet weighing performance requirements of internal calibration of the weigh module.

SUMMARY

The technical problem to be solved by the present invention is to provide an internal calibration mechanism to solve the problem that in the prior art, the mass and size of an internal calibration weight of an internal calibration mechanism of an electronic balance are limited.

The present invention solves the above technical problem through the following technical solution:
an internal calibration mechanism of a weigh module is provided, comprising an internal calibration driving structure and an internal calibration weight, characterized in that the internal calibration mechanism further comprises an internal calibration weight support frame; the internal calibration weight support frame is symmetrically arranged at both sides of a load-receiving portion of the weigh module, one side of the internal calibration weight support frame far away from a fixing portion of the weigh module is provided with an opening or a groove, and the opening or the groove is capable of loading the internal calibration weight; the internal calibration driving structure is capable of lifting the internal calibration weight away from the internal calibration weight support frame or placing the internal calibration weight in the opening or the groove of the internal calibration weight support frame;

the internal calibration weight support frame is connected to the load-receiving portion at both sides of the load-receiving portion, and joints therebetween each have a thin sheet structure; the internal calibration weight support frame is connected to a portion of the fixing portion extending towards the load-receiving portion, and joints therebetween each have a thin sheet structure; the internal calibration weight support frame and the load-receiving portion and the fixing portion of the weigh module are integrally formed; or one side of the internal calibration weight support frame far away from the opening or the groove comprises a force transmission connecting portion and a fulcrum connecting portion; joints between the force transmission connecting portion and a main body portion of the internal calibration weight support frame each have a thin sheet structure, and the force transmission connecting portion is fixedly connected to the load-receiving portion; joints between the fulcrum connecting portion and the main body portion of the internal calibration weight support frame each have a thin sheet structure, and the fulcrum connecting portion is fixedly connected to the portion of the fixing portion extending towards the load-receiving portion; or the internal calibration weight support frame is connected to the load-receiving portion at both sides of the load-receiving portion through flexure hinges; and the internal calibration weight support frame is connected, through a flexure hinge, to the portion of the fixing portion extending towards the load-receiving portion.

In this solution, the internal calibration driving structure and the internal calibration weight are mechanisms for loading the internal calibration weight on the support frame or unloading the internal calibration weight from the support frame in the prior art, which is not repeated herein. In this solution, no restriction is imposed on the structure and form of the internal calibration driving structure and the internal calibration weight.

In this solution, the internal calibration weight support frame and the load-receiving portion implement force transmission through the flexure hinge or by making their joint into a slice-like shape such as by means of cutting. The internal calibration weight support frame and the fixing portion implement a fulcrum function of a lever through the flexure hinge or by making their joint into a slice-like shape such as by means of cutting.

The internal calibration structure of this solution amplifies the force of the internal calibration weight on the weigh module by using the lever principle, and a simpler and more compact internal calibration structure is also achieved.

In addition, integrated forming can further reduce assembly parts, and processing, assembly, logistics and other costs also become lower.

In addition, in this solution, compared with flexure hinge mounting, independently designing the internal calibration weight support frame simplifies and reduces assembly parts and facilitates processing and assembly.

Further, the load-receiving portion, a parallel guide portion, the fixing portion and a lever of the weigh module are integrally formed.

In this solution, the main body portion of the whole weigh module is integrally formed, which reduces types of parts of the weigh module and reduces costs of processing, assembly, logistics, etc.

In addition, when the main body portion of the weigh module and the internal calibration mechanism are integrally formed, the types of parts of the weigh module can be simplified and the costs of processing, assembly, logistics, etc. are further reduced.

Further, the opening or the groove of the internal calibration weight support frame is a V-shaped opening or groove.

In this solution, the opening or the groove is designed as a V shape, which can stably load the internal calibration weight and prevent the internal calibration weight from shaking on the support frame.

Further, the force transmission connecting portion and the fulcrum connecting portion are respectively fixed to the load-receiving portion and the fixing portion by rivets or welding.

Further, a length from a center line of the opening or the groove of the support frame to the joint between the internal calibration weight support frame and the fixing portion is greater than a length from the joint between the internal calibration weight support frame and the load-receiving portion to the joint between the internal calibration weight support frame and the fixing portion.

In this solution, by setting a lever ratio, the gravity of the loaded internal calibration weight is amplified and transmitted to the load-receiving portion.

A weigh module is further provided, comprising the foregoing internal calibration mechanism.

The positive improvement effects provided are that an internal calibration weight with a smaller size can be obtained, and the power, size, etc. of a corresponding internal calibration motor can be made very small, so that the structure of the sensor is simple and compact, the size of the whole sensor is effectively reduced, and the calibration weighing performance is improved.

BRIEF DESCRIPTION OF THE DRAWINGS

In the accompanying drawings, identical parts are identified by identical reference numbers and.

DETAILED DESCRIPTION OF EMBODIMENTS

The present invention will be further described below by way of embodiments, but the present invention is not therefore limited to the scope of the described embodiments.

According to the present invention, under the condition that the mass of an internal calibration weight is limited and the size of a weigh module is limited, the self-calibration weight which is many times heavier than the self-weight of the internal calibration weight can be obtained through an amplification action of a lever mechanism, solving the problem that the internal calibration weight with a large weight is needed due to the limitation of size, space, etc.

Hereinafter, the implementation of the present invention will be illustrated by way of example via the following embodiments.

Figure 1:
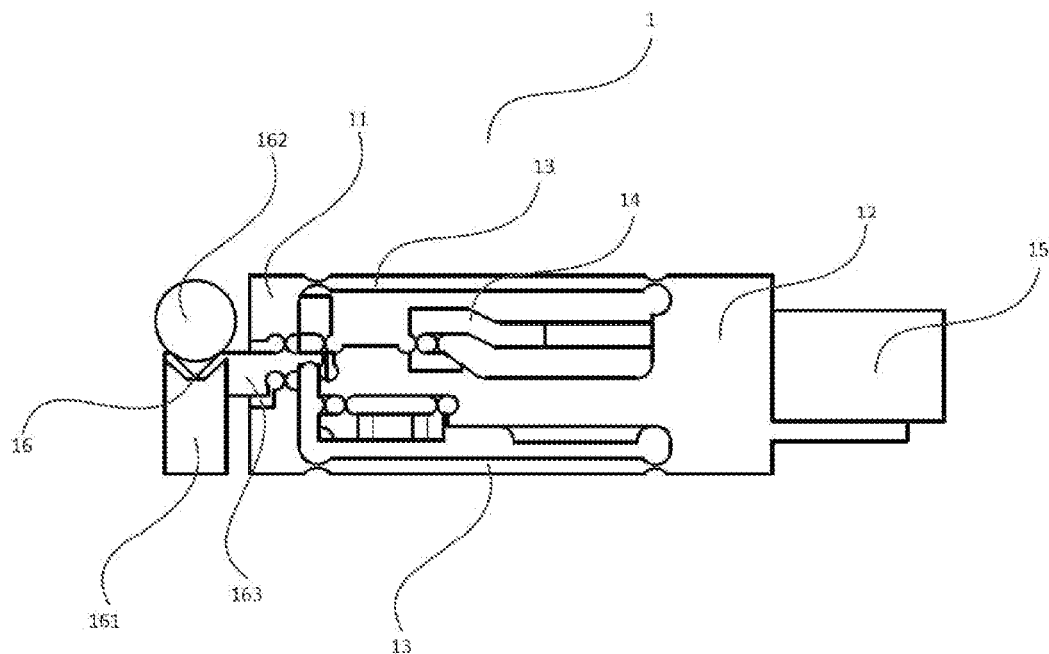
FIG. 1 is a schematic diagram of a weigh module according to a first embodiment of the inventive concept.
Figure 2:
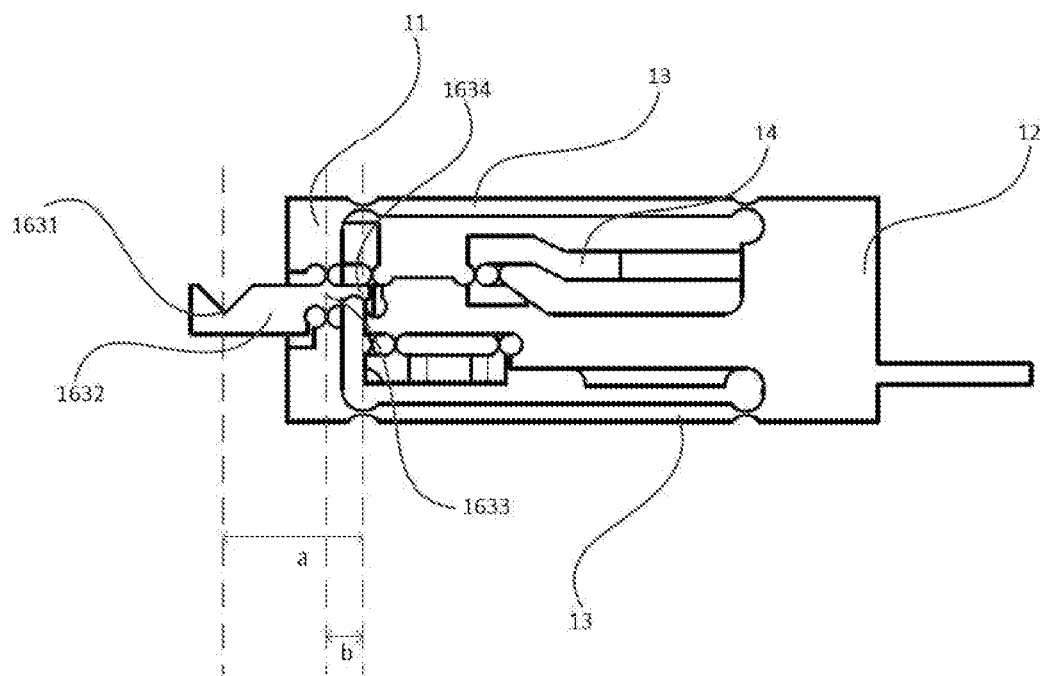
FIG. 2 is a schematic diagram of an internal calibration weight support frame of a weigh module according to an embodiment of the inventive concept.

In embodiments shown in FIGS. 1 and 2, a weigh module 1 comprises a load-receiving portion 11, a fixing portion 12, a parallel guide portion 13, a lever 14, a magnetic system structure 15, and an internal calibration mechanism 16.

The load-receiving portion 11, the parallel guide portion 13, the fixing portion 12 and the lever 14 are of an integrated structure, and are integrally formed by a whole piece of material. The integrated structure of this embodiment may be formed by die-casting, or by machining, or by die-casting and machining.

Functions of the load-receiving portion 11, the parallel guide portion 13, the fixing portion 12, the lever 14 and the magnetic system structure in this embodiment are consistent with functions of components for implementing force transmission of the weigh module in the prior art, which is not repeated herein.

The internal calibration mechanism 16 of this embodiment comprises an internal calibration driving structure 161, an internal calibration weight 162, and an internal calibration weight support frame 163. The internal calibration weight support frame 163 is provided with a V-shaped groove to load or place the internal calibration weight 162.

The internal calibration weight support frame 163 in this embodiment is symmetrically arranged at both sides of the weigh module 1, and the internal calibration driving mechanism 161 can lift the internal calibration weight 162 in a vertical direction on FIG. 2 and place the internal calibration weight onto the internal calibration weight support frame 163 for internal calibration. After the internal calibration is finished, the internal calibration driving mechanism 161 can also lift the internal calibration weight 162 away from the internal calibration weight support frame 163 in the vertical direction.

The internal calibration weight 162 thus has a calibrated state and an uncalibrated state in the weigh module. When in the calibrated state, the internal calibration weight 162 is put down by the internal calibration driving mechanism 161 and placed on the internal calibration weight support frame 163, and then the internal calibration driving mechanism 161 is reset; and in this case, a gap is formed between the internal calibration weight 162 and the internal calibration driving machine 161 in the vertical direction in FIG. 2, that is, the internal calibration weight 162 is separated from the internal calibration driving mechanism 161. When in the uncalibrated state, the internal calibration driving mechanism 161 lifted up the internal calibration weight 162, the internal calibration weight 162 is placed on the internal calibration driving mechanism 161, and a gap is formed between the internal calibration weight support frame 163 and the internal calibration weight 162 in the vertical direction in FIG. 2, that is, the internal calibration weight support frame 163 is separated from the internal calibration weight 162.

As shown in FIG. 2, the internal calibration weight support frame 163 comprises an internal calibration weight support portion 1631 configured to place the internal calibration weight 162 for internal calibration, a body portion of an internal calibration weight support frame 1632, and a connecting portion of an internal calibration weight support frame 1633 that is connected to the load-receiving portion 11 of the weigh module, wherein a joint between the connecting portion of the internal calibration weight support frame 1633 and the load-receiving portion 11 is cut into an flexure hinge to implement force transmission. The function of the flexure hinge is the same as that of a connecting flexure hinge in the weigh module assembled in the prior art, which is not repeated herein. A fulcrum portion of an internal calibration weight support frame 1634 where the connecting portion of the internal calibration weight support frame 1633 is connected to an extension portion of the fixing portion 12 is cut into an flexure hinge to play a role of a lever supporting point; and the function of the flexure hinge is the same as that of a fulcrum connecting flexure hinge in the weigh module assembled in the prior art, which is not repeated herein.

In this embodiment, the internal calibration mechanism 16, the load-receiving portion 11, the parallel guide portion 13, the fixing portion 12 and the lever 14 are of an integrated structure, and are integrally formed by a whole piece of material. Integrated processing can reduce the types of parts, thereby effectively reducing costs of parts processing, transportation, storage, etc. The sensor has good consistency in performance and is convenient to assemble, and the assembly efficiency can be improved.

As shown in FIG. 2, a distance between a weight support centre of the internal calibration weight support portion 1631 and the fulcrum portion of the internal calibration weight support frame 1634 that is connected to the fixing portion 12 is a, and a distance between the connecting portion of the internal calibration weight support frame 1633 and the fulcrum portion of the internal calibration weight support frame 1634 that is connected to the fixing portion 12 is b. If the weight of the internal calibration weight 162 is W, the mass loaded to the load-receiving portion 11 is W*a/b according to the lever principle. With the lever ratio, the weight W*a/b loaded on the load-receiving portion 11 by the internal calibration weight support frame 163 obviously increases the calibration weight compared with W. This makes it easier to meet the internal calibration weight requirements of the large-range weight, and the calibration of the sensor is completed, thereby better meeting performance requirements, and improving the accuracy of the weigh module.

Figure 3:
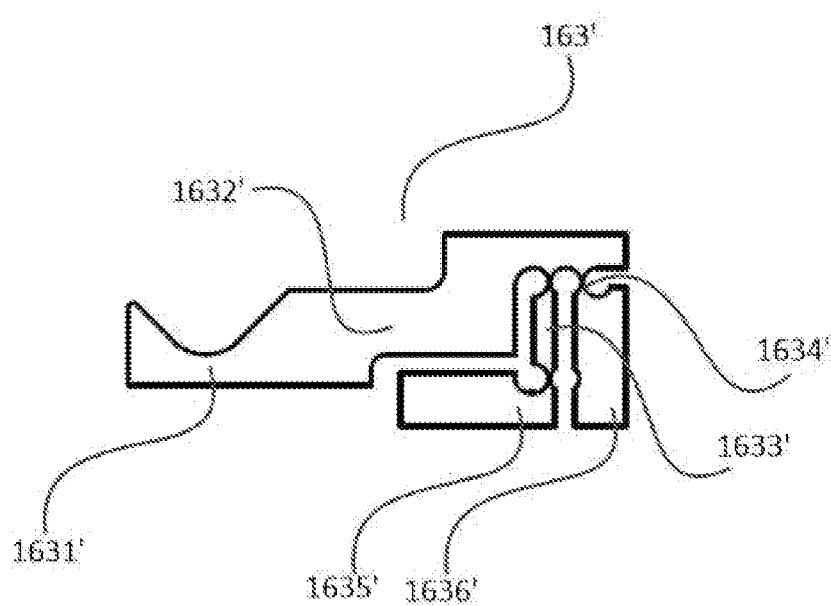
FIG. 3 is a schematic diagram of an internal calibration weight support frame according to another embodiment of the inventive concept.

In another embodiment, internal calibration weight support frames 163' are of a separated structure. As shown in FIG. 3, the internal calibration weight support frame 163' comprises an internal calibration weight support portion 1631', a body portion of an internal calibration weight support frame 1632', a connecting portion of an internal calibration weight support frame 1633', a fulcrum portion of an internal calibration weight support frame 1634', a connecting portion 1635' connected to the load-receiving portion 11, and a connecting portion 1636' connected to the fixing portion 12.

Thin sheet structures between components of the internal calibration weight support frame 163' in this embodiment replace connecting flexure hinges and fulcrum flexure hinges, reduce the types of parts and facilitate assembly.

The internal calibration weight support frame 163', the load-receiving portion 11 and the fixing portion 12 are in fixed connection, such as screw connection, riveting, welding and other connection manners. There are two internal calibration weight support frames 163', which are respectively fixed at both sides of the weigh module 1.

The internal calibration weight support frames 163' of this embodiment are of a separated structure, which can reduce the processing difficulty and processing cost, and can also meet requirements for high performance of the weigh module.

Although specific implementations of the present invention have been described above, those skilled in the art should understand that these are merely examples, and the scope of protection of the present invention is defined by the appended claims. Those skilled in the art may make various changes or modifications to these embodiments without departing from the principles and essence of the present invention, but all these changes and modifications fall within the scope of protection of the present invention.

What is claimed is:

1. An internal calibration mechanism of a weigh module having a load-receiving portion, a fixing portion, a parallel guide portion, and a lever, the mechanism comprising:
   an internal calibration driving structure;
   an internal calibration weight; and
   an internal calibration weight support frame that is symmetrically arranged at a left and right side of the load-receiving portion and connected at a connecting portion to the load receiving portion such that:
      an opening or groove, configured for loading the internal calibration weight, is provided on a side of the internal calibration weight support frame that faces away from the fixing portion, the opening or the groove arranged for loading the internal calibration weight; and
      the internal calibration driving structure is arranged for lifting the internal calibration weight away from the internal calibration weight support frame or for placing the internal calibration weight in the opening or the groove;
   joints having a thin sheet structure that directly connect the internal calibration weight support frame to the left and right side of the load receiving portion at the connecting portion; and
   joints having a thin sheet structure that directly connect the internal calibration weight support frame to an extending portion of the fixing portion that extends towards the load-receiving portion at a fulcrum connecting portion connected to the fixing portion;
   wherein the internal calibration weight support frame, the load-receiving portion and the fixing portion are integrally formed;
   wherein the joints form part of a force transmission pathway for the internal calibration weight when the internal calibration weight is placed in the opening or the groove, said force transmission pathway extending between the opening or the groove, the extending portion of the fixing portion, and the load-receiving portion.

2. The mechanism of claim 1, further comprising:
   a force transmission connecting portion, positioned on a side of the internal calibration weight support frame that is away from the opening or the groove, the force transmission connection portion being fixedly connected to the load-receiving portion, wherein the fulcrum connecting portion is positioned on the side of the internal calibration weight support frame that is away from the opening or the groove, the fulcrum connecting portion being fixedly connected to an extending portion of the fixing portion that extends towards the load-receiving portion;
   joints having a thin sheet structure that connect the force transmission connecting portion to a main body portion of the internal calibration weight support frame; and
   joints having a thin sheet structure that connect the fulcrum connecting portion and the main body portion of the internal calibration weight support.

3. The mechanism of claim 2, wherein the force transmission connecting portion and the fulcrum connecting portion are respectively fixed to the load-receiving portion and the fixing portion by rivets or welding.

4. The mechanism of claim 1, wherein:
the load-receiving portion, the parallel guide portion, the fixing portion and a lever of the weigh module are integrally formed.

5. The mechanism of claim 1, wherein:
the opening or the groove of the internal calibration weight support frame is a V-shaped opening or groove.

6. The mechanism of claim 1, wherein:
a distance measured from a center line of the opening or the groove to the joint between the internal calibration weight support frame and the fixing portion is larger than a distance measured from a joint between the internal calibration weight support frame and the load-receiving portion to the joint between the internal calibration weight support frame and the fixing portion.

7. A weigh module, comprising:
an internal calibration mechanism according to claim 1, mounted at one side of a load-receiving portion of the weigh module.

\* \* \* \* \*